May 9, 1967  R. A. DOUBT  3,318,411
SIGNAL GENERATOR
Filed Dec. 18, 1964

INVENTOR
R.A. DOUBT

BY  *Young & Quigg*

ATTORNEYS

United States Patent Office 3,318,411
Patented May 9, 1967

3,318,411
SIGNAL GENERATOR
Ralph A. Doubt, Bartlesville, Okla., assignor to Phillips
Petroleum Company, a corporation of Delaware
Filed Dec. 18, 1964, Ser. No. 419,346
3 Claims. (Cl. 181—.5)

This invention relates to the generation of seismic signals by imparting vibrations to the earth.

It is common practice in geophysical prospecting to impart vibrations to the earth by detonating explosive charges. While this procedure has been employed for many years, it is not entirely satisfactory for all operations. The explosive charges are generally detonated in shot holes, the drilling of which can be expensive and time consuming. In addition, the resulting explosive charge often generates considerable energy which is propagated in directions other than the desired downward direction. Other procedures have been employed in recent years to generate seismic signals. One such method involves dropping a relatively heavy weight to the earth to create vibrations. The weight is normally transported by a truck and elevated by a derrick attached to the truck. However, the transportation and dropping of a heavy weight creates problems in many areas, and such a procedure obviously can not be used in marine prospecting.

In accordance with this invention, an improved seismic signal generator is provided. The generator comprises a first weight which rests on the earth. A guide member extends upwardly from the first weight, and a second weight is positioned within the guide member at an intermediate region. The resulting chamber above the second weight is filled with a material which is capable of being expanded rapidly to drive the second weight downwardly into engagement with the first weight. The resulting impact imparts a shock wave to the earth. This particular apparatus can be employed to advantage in marine prospecting by positioning the first weight on or below the surface of the water.

Accordingly, it is an object of this invention to provide an improved signal generator for imparting seismic vibrations.

Another object is to provide a seismic signal generator which can be employed either on land or in marine prospecting.

Other objects, advantages and features of the invention should become apparent from the following detailed description which is taken in conjunction with the accompany drawing in which.

Figure 1:
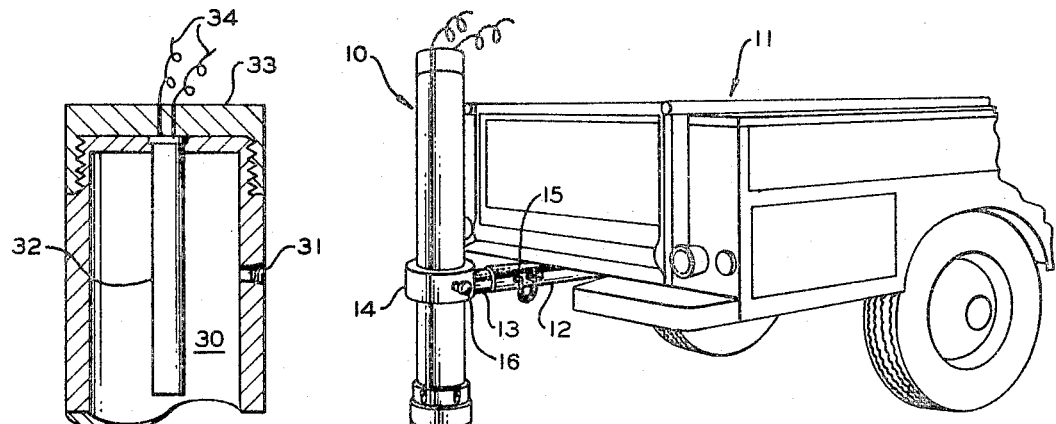
FIGURE 1 illustrates an embodiment of the signal generator of this invention positioned to impart vibrations to the earth.

Referring now to the drawing in detail and to FIGURE 1 in particular, the signal generator 10 of this invention is shown positioned to impart vibrations to the earth. As illustrated, the signal generator rests on the earth and is held in place by a suitable connection to a truck 11. A sleeve 12 is secured to truck 11 and extends therefrom to receive a support rod 13. Signal generator 10 extends through a ring 14 which is attached to the end of rod 13. When the signal generator is being transported to a selected location, a retaining pin 15 in sleeve 12 can be removed to permit the signal generator to be rotated to a horizontal position, where it is again held by pin 15.

A retaining pin 16 can be employed to secure the signal generator to ring 14. When the signal generator is positioned vertically for normal operation, it is free to slide in ring 14 so as to rest on the earth.

Figures 2, 3:
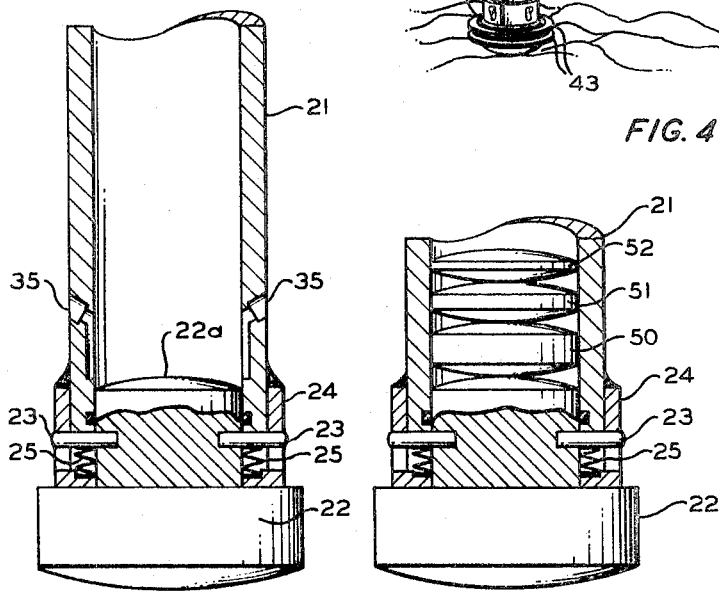
FIGURE 2 is a detailed view, shown partially in section, of an embodiment of the signal generator of this invention.
FIGURE 3 illustrates a modified form of the signal generator of FIGURE 2.

Signal generator 10 is illustrated in detail in FIGURE 2. Cylindrical sections 20 and 21 are threaded together to form an elongated tube. A weight 22 is secured to the lower end of cylinder 21 by a plurality of pins 23 which extend from weight 22 through slots in an annular member 24, the latter being secured to cylinder 21 and depending therefrom. Springs 25 extend between pins 23 and the base of member 24. As illustrated, the lower surface of weight 22 is in the form of a spherical sector, as is the upper surface of an integral section 22a of weight 22 which extends into cylinder 21.

A disk 26 is positioned between cylinders 20 and 21. A second weight 27 is secured to disk 26 by a pin 28 which extends through a downwardly extending portion of the disk.

A chamber 30 is formed in cylinder 20 above disk 26. Cylinder 20 is provided with a port 31 which permits an expansible fluid to be disposed in chamber 30. An ignition or heat producing device 32 is suspended within chamber 30, and can be retained in place by an end cap 33 on cylinder 20.

In operation, chamber 30 is filled with a material which is capable of being expanded quite rapidly when heated or ignited. For example, the chamber can be filled with a liquid, such as liquid carbon dioxide, which can readily be vaporized. As an alternate, the chamber can be filled with an exposive material. If an expansible liquid is employed, device 32 can be Thermit or other incendiary material capable of supplying a source of heat. By application of an electrical current through wires 34 to ignite device 32, the temperature of chamber 30 is elevated rapidly so that the liquid therein is rapidly vaporized. This creates a large force which ruptures disk 26 to drive weight 27 downwardly. The resulting impact on weight 22 imparts vibrations to the earth on which the signal generator is resting. Disk 26 is machined so as to have strength sufficient to support weight 27 in the initial position, but is sufficiently weak to be ruptured rapidly by the driving force from chamber 30.

In order to permit the air in cylinder 21 to escape as weight 27 is driven downwardly, exhaust ports 35 are provided. It should be noted that these ports point upwardly so that the expelled air exerts a force tending to hold the cylindrical assembly against weight 22. Springs 25 permit weight 22 to be displaced downwardly from cylinder 21 when weight 27 strikes weight 22.

Although a conventional explosive charge, such as gunpowder or the like, can be employed to provide the driving force in this signal generator, it is desirable to employ a readily vaporizable liquid. This minimizes the extraneous vibrations which are imparted to the earth, as normally occurs when a conventional exposive charge is detonated.

In order to reload the signal generator, the cylinders can be taken apart and weight 27 lifted to the top of cylinder 21 where it is attached to a new rupture disk. After the cylinders are reassembled, a new charge and ignition device are placed in chamber 30.

Figure 4:
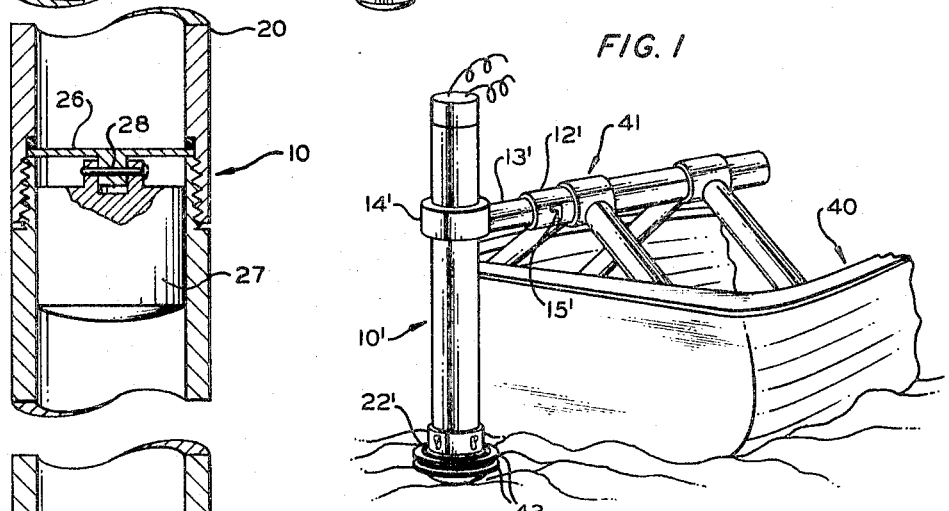
FIGURE 4 illustrates the signal generator of this invention employed to impart vibrations to a body of water.

The signal generator of this invention can be employed to impart vibrations to a body of water. This is required in seismic prospecting operations conducted offshore or in swampy areas, for example. An arrangement particularly useful in imparting vibrations to a body of water is illustrated schematically in FIGURE 4. Signal generator 10′ is suspended in the water by being secured to a boat 40. A frame assembly 41 secures sleeve 12′.

Sleeve 12' supports rod 13' which is attached to collar 14'. The signal generator can be secured rigidly to collar 14' so that weight 22' is suspended on or beneath the surface of the water. In addition, a plurality of spaced disks 43 are secured to weight 22'. These disks extend outwardly from the weight so as to increase the effective area of contact between the weight and the water. This increases the amplitude of the signal imparted to the water when the signal generator is energized.

The signal generator of this invention can be modified as illustrated in FIGURE 3. In this embodiment, a plurality of additional weights 50, 51 and 52 are positioned within cylinder 21 so as to rest on weight 22. It should be observed that each of these added weights is provided with spherically shaped ends so that the area of engagement between the weights is minimized. Ideally, there is only point contact. In addition, the weights are progressively smaller in size in a direction extending upwardly. It can be demonstrated mathematically that the additional weights employed in this manner increase the amplitude of vibrations imparted by weight 22 when a force is applied to upper weight 52.

While this invention has been described in conjunction with presently preferred embodiments, it should be evident that it is not limited thereto.

What is claimed is:

1. Signal generating apparatus comprising an elongated generally cylindrical hollow member; a first generally cylindrical weight having one section thereof formed as a spherical segment; means resiliently securing said first weight to said elongated member so that said first weight is free to move away from said elongated member, said one section of said first weight facing the interior of said hollow member; a second generally cylindrical weight having one end formed as a spherical segment; means positioning said second weight in an intermediate region of said elongated member so that said one end of said second weight faces said first weight; means closing the end of said elongated member which is remote from said first weight so as to form a chamber between said second weight and said remote end of said elongated member, said chamber being adapted to contain an expansible material and a means capable of initiating rapid expansion of said material, whereby expansion of said material serves to propel said second weight through said elongated member toward said first weight; and a plurality of additional generally cylindrical weights positioned within and partially filling said hollow member, each of said additional weights having ends formed as spherical segments, said additional weights being of progressively smaller masses in the direction said member extends away from said first weight, said second weight and said additional weights each having a diameter substantially equal to but slightly smaller than the inner diameter of said hollow member, whereby said second weight strikes the additional weight of smallest mass and the resulting impact is transmitted through the remainder of said additional weights to said first weight.

2. The apparatus of claim 1 wherein said means securing said first weight to said elongated member comprises at least one pin extending from said first weight through an opening in said elongated member and a spring urging said first weight toward the closed end of said elongated member.

3. The apparatus of claim 1, further comprising at least one disk secured to and extending outwardly from said first weight to increase the contact surface of said first weight with the medium to which vibrations are to be imparted.

References Cited by the Examiner

UNITED STATES PATENTS

| 1,753,368 | 4/1930 | Du Bois-Reymond et al. | 181—.5 |
| 2,203,140 | 6/1940 | Green | 181—.5 |
| 2,933,068 | 4/1960 | Johnson et al. | 181—.5 |
| 3,130,809 | 4/1964 | Flatow | 181—.5 |
| 3,209,854 | 10/1965 | Williams | 181—.5 |

FOREIGN PATENTS 608,169    11/1960    Canada.

BENJAMIN A. BORCHELT, *Primary Examiner.*

G. H. GLANZMAN, *Assistant Examiner.*